US006007267A

United States Patent [19]

VanHorn

[11] Patent Number: 6,007,267

[45] Date of Patent: Dec. 28, 1999

[54] MECHANICAL LOAD FUSE ASSEMBLY

[75] Inventor: James R. VanHorn, Scottsdale, Ariz.

[73] Assignees: Kenneth Roberts, Colo.; James Roberts, Ariz.

[21] Appl. No.: 09/118,119

[22] Filed: Jul. 16, 1998

[51] Int. Cl.[6] .......... F16B 27/00

[52] U.S. Cl. .......... 403/2; 403/41

[58] Field of Search .......... 403/2, 41, 78, 403/79

[56] References Cited

U.S. PATENT DOCUMENTS

| | | | |
|---|---|---|---|
| 3,185,413 | 5/1965 | Walker . | |
| 3,304,031 | 2/1967 | Mulquin . | |
| 3,794,057 | 2/1974 | Badger | 137/68 |
| 4,016,796 | 4/1977 | Brannan . | |
| 4,330,926 | 5/1982 | McCall . | |
| 5,122,007 | 6/1992 | Smith . | |
| 5,466,082 | 11/1995 | Sherar . | |
| 5,599,129 | 2/1997 | Clifton . | |

FOREIGN PATENT DOCUMENTS

| | | | |
|---|---|---|---|
| 595903 | 7/1945 | United Kingdom | 403/325 |

*Primary Examiner*—Lynne H. Browne
*Assistant Examiner*—Kenneth Thompson
*Attorney, Agent, or Firm*—LaValle D. Ptak

[57] ABSTRACT

A mechanical load fuse assembly, particularly designed for lifting cables used with helicopters, consists of first and second end assemblies. An axial shear pin is releasably secured between the first and second end assemblies; and this shear pin is calibrated to have a breaking point of a pre-established amount when axial forces are applied to it. A protective sleeve is located over the shear pin between the first and second end assemblies when the shear pin is releasably secured. This protective sleeve has first and second positions of operation. A coil spring is used to normally bias the protective sleeve to the first position. In this position, radially projecting pins on the first and second end assemblies engage corresponding slots on the protective sleeve to prevent relative rotation of the first and second end assemblies relative to one another, so long as the sleeve is in the first position. The protective sleeve may be moved to the second position against the force of the spring to allow the first and second end assemblies to be rotated relative to one another to facilitate the removal and insertion of axial shear pin devices.

16 Claims, 2 Drawing Sheets

30 40 36 52 44 70 20 62 14 34 68 31 32 67 12 64 40 66 16 46 70 11 10

9
10
12
14
16
18
20
20
20
29
30
32
34
36
38
40
40
44
46
48
50
52
60
61
61
64
66
67
68

3
3
30
44
48
10
12
34
32
40
50
20
14

40
30
36
52
44
70
20
62
14
34
68
31
32
12
67
64
40
66
16
46
70
11
10

MECHANICAL LOAD FUSE ASSEMBLY

BACKGROUND

In various mechanical devices, a need exists for a mechanical fuse or shear pin to sever a connection between two mechanical components when stress in excess of some pre-established amount occurs between the two parts. Shear pins, for example, are used to connect a propeller of an outboard motor to the drive shaft of the motor; so that if the propeller should strike an obstruction, the shear pin will break before damage to the drive train of the motor takes place. Typically, shear pins of this type are used to secure a propeller with a shaft-receiving portion on it by inserting the shear pin radially through a cylindrical extension on the propeller and through the drive shaft which is inserted into this extension. Thus, if an excessive rotational force should be generated between the propeller and the drive shaft, the shear pin is broken or "sheared"; and the drive shaft can spin free within the propeller extension without damage to the motor drive train.

Devices using shear pins which are oriented transversely to the direction of pull are disclosed in three United States patents to Smith U.S. Pat. No. 5,122,007, McCall U.S. Pat. No. 4,330,926, and Shearar U.S. Pat. No. 5,466,082. All of these patents employ essentially the same general principles of operation. The devices of the Smith and Shearar patents both are capable of relatively easy insertion and replacement of the shear pins. In the Smith device, the shear pin is held in place by means of a rubber "O" ring which encircles the device and extends across both ends of the shear pin. In the device of the Shearar patent, the shear pin has cotter pin retainers in both ends of it; so that a bit more effort is involved in replacing and changing the shear pin of this device than is required for that of the Smith device.

Some applications exist where a load fuse or a shear pin oriented in a longitudinal direction, or in the direction of pull, is preferred over the transversely oriented shear pins of the above patents. For example, for load lifting cables used with helicopters, it is desired to provide some type of link in the lifting cable which will break when an excessive load is applied to the cable. Lifting cables, which are used with helicopters to lift and deliver loads while the helicopter is airborne, are subject to situations where either the load or the cable become entangled with an obstruction. If the force exerted on the cable exceeds the load capabilities of the helicopter, a catastrophic accident may occur. Consequently, applications exist for an axial longitudinal mechanical load fuse for such situations.

The United States patent to Clifton U.S. Pat. No. 5,599,129 is directed to a load limited conductor using an axially oriented breakaway pin (or multiple pins). The pin or pins of this device are in the form of bolts which are used to interconnect the two connector portion of the assembly in which they are used. These bolts are simple threaded into place to interconnect the assemblies; and the bolts have a pre-established breaking tension. These devices are broken along their axial length or upon the application of axial tension to them.

The U.S. patent to Walker U.S. Pat. No. 3,185,415 is directed to an integral tension bar retainer for aircraft. The device of this patent employs a shear pin which is axially located within the retainer and is held in place by means of a spring-loaded retainer cam. Rotation of the cam allows insertion and replacement of different shear pins. There is nothing to prevent accidental rotation of the cam in this device.

It is desirable to provide a mechanical load fuse or shear pin device which overcomes the disadvantages of the prior art, which permits easy removal and insertion or replacement of different load fuses, which is simple to construct, and which functions to prevent accidental removal of a load fuse element in a completed assembly.

SUMMARY OF THE INVENTION

It is an object of this invention to provide an improved mechanical breakaway device.

It is another object of this invention to provide an improved mechanical load fuse assembly employing replaceable breakaway fuse elements with a device for preventing accidental removal of the fuse element.

It is a further object of this invention to provide an improved mechanical load fuse assembly employing removable fuse elements interconnecting a pair of end assemblies with a protective shield to prevent accidental disassembly.

In accordance with a preferred embodiment of the invention, a mechanical load fuse assembly includes first and second end assembly members. An axial shear pin device is releasably secured between the first and second end assemblies; and a protective sleeve is located over the axial shear pin between the first and second assemblies. This protective sleeve is designed with first and second positions of operation. A biasing device engages the protective sleeve to normally bias it to its first position. In the first position, sleeve holding members on the first and second end assemblies engage cooperating portions of the sleeve to prevent relative rotation of the first and second end assemblies with the sleeve. When the sleeve is moved to its second position, relative rotation between the first and second end assemblies may take place to facilitate removal or insertion of an axial shear pin device into the first and second end assemblies.

DETAILED DESCRIPTION

Figure 1:
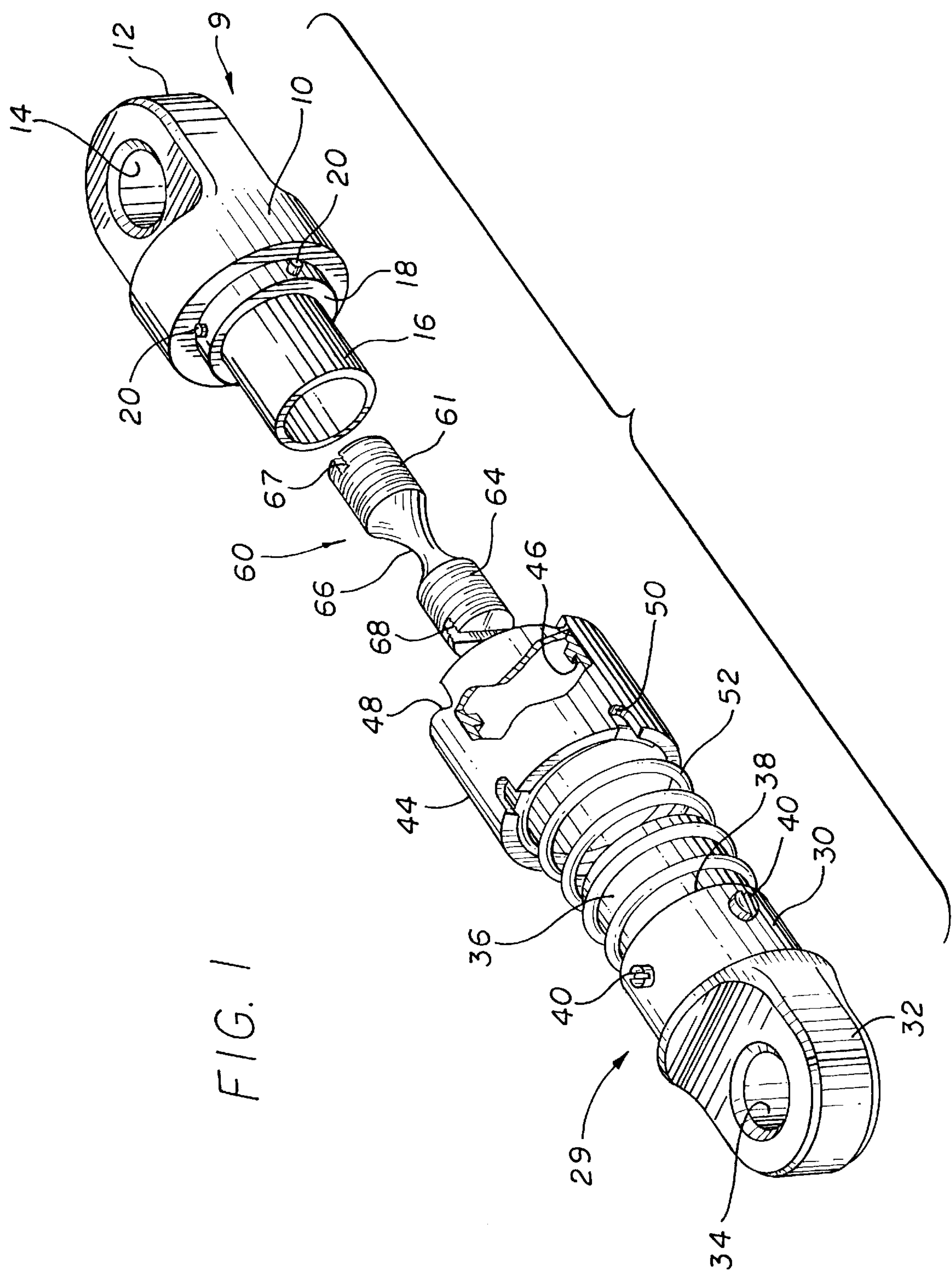
FIG. 1 is an exploded view of a preferred embodiment of the invention.

Reference now should be made to the drawings, in which the same reference numbers are used throughout the different figures to designate the same components. FIG. 1 is an exploded view of a preferred embodiment of the invention. This embodiment includes a first male end assembly 9, which has a cylindrical main body portion 10 with a shoulder 18 on it and a hollow cylindrical extension 16. The opposite end of the end assembly 9 includes an extension 12 with an eyelet 14 through it for connection to a cable, such as a lifting cable used with helicopters, cranes and the like. On the periphery of the shoulder portion 18, between the shoulder and the main body portion 10, there are four pins 20 located at 90° intervals and extending radially outwardly from the assembly, as shown most clearly in FIGS. 1 and 3.

The opposite end of the device includes a second end assembly 20, which is a female assembly including a cylindrical main body portion 30 with a hollow cylindrical extension 36 terminating in a shoulder 38 which abuts the main portion 30. On the left-hand end of the assembly 29, as viewed in FIG. 1, there is an extension 32 having an eyelet 34 through it for connection to a cable or the like, in the same manner as the eyelet 14 on the end assembly 9 described previously. On the main body portion 30, four screws or pins 40 are located at 90° intervals around the periphery of the portion 30 and extend radially outwardly, as illustrated most clearly in FIGS. 1 and 3.

Figure 3:
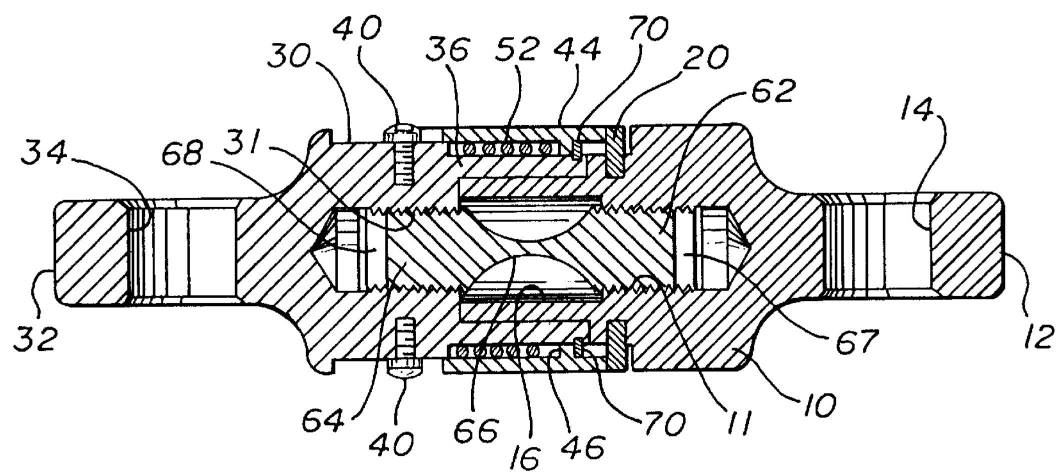
FIG. 3 is a cross-sectional view taken along the line 3—3 of FIG. 2.

As shown most clearly in FIG. 3, the internal portions of both of the end assemblies 9 and 29 are internally threaded inside the main body portions 10 and 30 to receive opposite ends of mechanical load fuse 60. The load fuse 60 is threaded externally at 62 and 64 on its opposite ends, and includes slots 67 and 68 for engagement by a screwdriver or the like. To assemble the device, the end 62 typically is inserted into the male housing member 9 and is screwed into place in the internal threads 11 by means of the slot 68 to the position illustrated in FIG. 3. The opposite end 64 then is inserted into the female end assembly and is threaded into place in the internal threads 31, also as shown in FIG. 3. It should be noted that when the device is assembled in this manner, the cylindrical projection 16 of the end assembly 9 extends into and is encased within the extension 36 on the female end assembly 29, again as shown most clearly in FIG. 3. The device which is described thus far and which is assembled as described constitutes a mechanical load fuse assembly. This load fuse assembly will break at the weakened area 66 shown in the load fuse 60 when a longitudinal or axial force in excess of the breaking strength of the restricted area 66 is exceeded by pulls in the opposite direction by cables (not shown) inserted through the eyelets 14 and 34.

When a load fuse of the type which is described above is used in conjunction with lifting cranes or, most particularly, with helicopters, there may be a tendency at times for the end assemblies 9 and 29 to rotate relative to one another. If this rotation should be in a counterclockwise direction, it is possible that sufficient rotation could occur to unthread or unscrew either of the load fuse ends 62 or 64, or both of them, to a point, where the device would be disassembled and fall apart, even though an excess load was not reached. This particularly could happen with a helicopter load which is being carried over terrain if the load, for example, should bump an obstruction and start to spin. To prevent such an accidental uncoupling of the device and yet permit the relatively easy insertion and removal of the load fuse 60 which is effected by means of the threaded ends 62 and 64, a protective sleeve 44 is provided, as shown in all three of the figures.

The protective sleeve has four slots located in its left-hand end (as viewed in all three figures), which slide over the projecting screws 40 in the female end assembly 30. fit the opposite end, cammed surfaces 48 are provided which slope in a direction to permit clockwise rotation of the sleeve 44 relative to the male end assembly 9. The cammed surfaces 48 include a shoulder to prevent relative counterclockwise rotation. The shoulder is located relative to the slots 50; so that the pins 20 extending from the male end assembly engage the shoulders of the cam surfaces 48 when the sleeve 44 is in place over the assembled device and over the region in which the axial shear pin or fuse 60 is located. This is shown most clearly in the cross-sectional view of FIG. 3.

Figure 2:
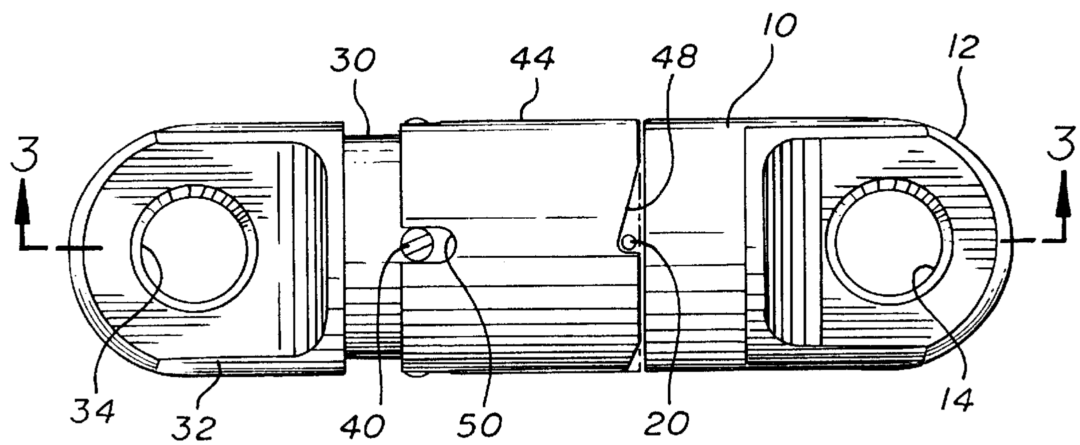
FIG. 2 is an assembled view of the embodiment shown in FIG. 1.

To assemble the sleeve 44 onto the device, a coil spring 52 is first placed over the cylindrical extension 36 of the female end assembly 29. One end of the spring 52 abuts the shoulder between the extension 36 and the main body portion 30 of the end assembly 29, as shown most clearly in FIGS. 1 and 3. The sleeve 44 then is slid into place; and the opposite end of the spring 52 abuts an internal shoulder 46 formed near the right-hand end of the sleeve 44, as shown most clearly in FIGS. 1 and 3. A retaining ring 70 then is clipped into place in a groove near the right-hand end of the cylindrical portion 36 to hold the spring and sleeve 44 in place on the assembly 30/36. This is the position which is used when the devices are assembled to thread the end 64 of the fuse link 60 into the internal threads 31 in the main body portion 30 of the female or left-hand end assembly as viewed in FIGS. 1, 2 and 3. The cam surface 48 permits this relative rotation in a clockwise direction, with the pins 20 simply riding on the cam surfaces 48 to push the sleeve 44 toward the left and back again, as viewed in FIGS. 1, 2 and 3, as the devices are turned together. The sleeve 44 simply slides longitudinally or axially back and forth, with the slot 50 moving over the screws 40 when this is done. Once the device is assembled, however, accidental rotation in the counterclockwise or unthreading direction for the load fuse or shear pin device 60 cannot take place, because the pins 20 abut the shoulders on the cam surfaces 48 on the right-hand end of the sleeve 44. At the other end, the slots 50 engage the screws 40 to prevent rotation in either direction at the left-hand end of the sleeve 44. Consequently, accidental unscrewing or unthreading of the load fuse 60 from either the threads 11 in the male end assembly 9 or the threads 31 in the female end assembly 29 is prevented.

Whenever insertion or replacement of a load fuse is desired, the sleeve 44 is engaged and pulled toward the left, as viewed in the various figures, to bottom the slot 50 against the screws 40. This causes the right-hand edge or the upper right-hand edge of the sleeve 44 to clear the pins 20. When this is done, the two parts 9 and 29 easily may be rotated counterclockwise to remove the fuse element 60, whenever desired. Accidental removal, however, is prevented by means of the spring biased sleeve 44, which has been described above. It is apparent that the housing 9/29 can be disassembled, without tools, to inspect or replace the fuse 60. The spring loaded sleeve 44, however, provides a positive mechanical safety to prevent inadvertent separation of the two housing parts 9 and 29.

The foregoing description of a preferred embodiment of the invention is to be considered as illustrative and not as limiting. Various changes and modifications will occur to those skilled in the art for performing substantially the same function, in substantially the same, to achieve substantially the same result without departing from the true scope of the invention as defined in the appended claims.

What is claimed is:

1. A mechanical load fuse assembly including in combination:

a first end assembly;

a second end assembly;

an axial shear pin device releasably secured between said first and second end assemblies;

a protective sleeve located over said axial shear pin device between said first and second assemblies, with said axial shear pin device secured between said first and second assemblies, said protective sleeve having first and second positions of operation;

a biasing device engaging said protective sleeve to normally bias said sleeve to said first position of operation; and sleeve holding members on said first and second assemblies engaging cooperating portions of said sleeve to prevent relative rotation of said first and second end assemblies with said sleeve in said first position of operation, movement of said sleeve to said second position of operation allowing said first and second end assemblies to be rotated relative to one another, said sleeve allowing axial movement of said first and second end assemblies away from one another in either of said first and second positions of operation.

2. The combination according to claim 1 wherein said axial shear pin device has a weakened region therein designed to separate upon application of a predetermined axial force thereto.

3. The combination according to claim 2 wherein each of said first and second end assemblies have an internally threaded portion therein, and said axial shear pin device has first and second ends with externally threaded portions thereon for threadedly enraging the internally threaded portions of said first and second end assemblies to releasably secure said axial shear pin device between said first and second end assemblies.

4. The combination according to claim 3 wherein said biasing device comprises a spring.

5. The combination according to claim 4 wherein said biasing device comprises a coil spring, said first end assembly has a shoulder thereon, and said protective sleeve has an internal shoulder thereon with said coil spring extending between the shoulder on said first end assembly and the internal shoulder or said protective sleeve.

6. The combination according to claim 5 wherein said first end assembly has a cylindrical portion with a first internal diameter and said second end assembly terminates in a cylindrical portion having an external diameter not greater than the first internal diameter of said first end assembly, such that when an axial shear pin device is releasably secured between said first and second end assemblies, the cylindrical portion of said second end assembly fits inside the cylindrical portion of said first end assembly and surrounds said axial shear pin.

7. The combination according to claim 6 wherein said sleeve holding members comprise projections extending outwardly from each of said first and second end assemblies and said cooperating portions of said sleeve comprise slots thereon for engaging said projecting members on said first and second end assemblies.

8. The combination according to claim 7 wherein said protective sleeve has first and second ends, and said projecting members on said first end assembly extend into open slots on said first end of said sleeve and said holding members on said second end assembly comprise outwardly extending pins engaging cammed slots on said second end of said protective sleeve, whereupon said first and second end assemblies with said sleeve in said first position may be rotated in a first direction relative to one another but are prevented from rotation in a second direction relative to one another.

9. The combination according to claim 8 further including a retaining ring for holding said protective sleeve and said biasing device on said first end assembly in engagement with said protective sleeve holding members on said first end assembly to prevent relative rotation of said protective sleeve with respect to said first end assembly while allowing limited axial movement of said protective sleeve relative to said first end assembly.

10. The combination according to claim 1 wherein said biasing device comprises a spring.

11. The combination according to claim 1 wherein said biasing device comprises a coil spring, said first end assembly has a shoulder thereon, and said protective sleeve has an internal shoulder thereon with said coil spring extending between the shoulder on said first end assembly and the internal shoulder on said protective sleeve.

12. The combination according to claim 11 further including a retaining ring for holding said protective sleeve and said biasing device on said first end assembly in engagement with said protective sleeve holding members on said first end assembly to prevent relative rotation of said protective sleeve with respect to said first end assembly while allowing limited axial movement of said protective sleeve relative to said first end assembly.

13. The combination according to claim 1 wherein said sleeve holding members comprise projections extending outwardly from each of said first and second end assemblies and said cooperating portions of said sleeve comprise slots thereon for engaging said projecting members on said first and second end assemblies.

14. The combination according to claim 13 wherein said protective sleeve has first and second ends, and said projecting members on said first end assembly extend into open slots on said first end of said sleeve and said holding members on said second end assembly comprise outwardly extending pins engaging cammed slots on said second end of said protective sleeve, whereupon said first and second end assemblies with said sleeve in said first position may be rotated in a first direction relative too one another but are prevented from rotation in a second direction relative to one another.

15. The combination according to claim 1 wherein each of said first and second end assemblies have an internally threaded portion therein, and said axial shear pin device has first and second ends with externally threaded portions thereon for threadedly engaging the internally threaded portions of said first and second end assemblies to releasably secure said axial shear pin device between said first and second end assemblies.

16. The combination according to claim 1 wherein said first end assembly has a cylindrical portion with a first internal diameter and said second end assembly terminates in a cylindrical portion having an external diameter not greater than the first internal diameter of said first end assembly, such that when an axial shear pin device is releasably secured between said first and second end assemblies, the cylindrical portion of said second end assembly fits inside the cylindrical portion of said first end assembly and surrounds said axial shear pin.

* * * * *